July 20, 1954 J. E. HINES, JR 2,684,124
GRAVITY MOVING BED ADSORPTION PROCESS AND APPARATUS
Filed March 15, 1949
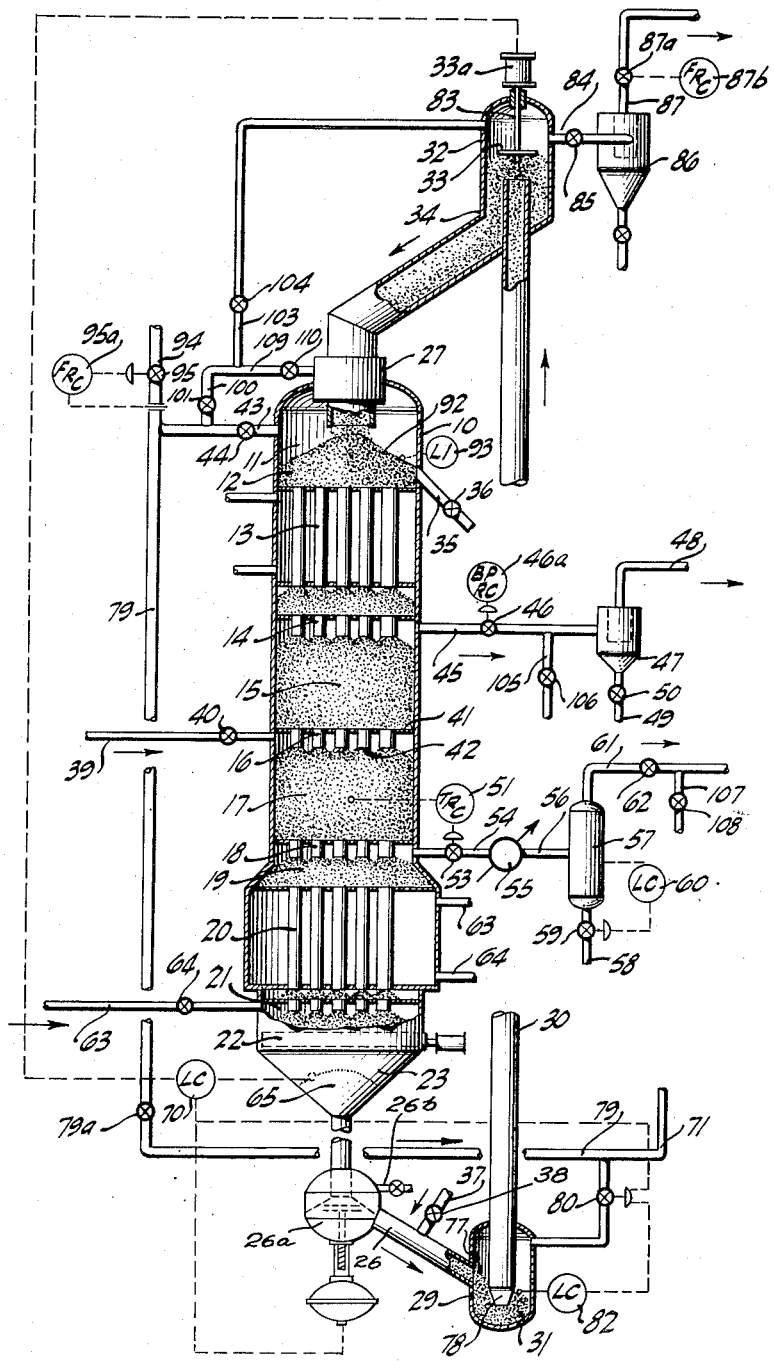
INVENTOR.
JOHN E. HINES JR.,
BY Ross J. Garofalo
ATTORNEY.

Patented July 20, 1954

2,684,124

UNITED STATES PATENT OFFICE 2,684,124

GRAVITY MOVING BED ADSORPTION
PROCESS AND APPARATUS

John E. Hines, Jr., Long Beach, Calif., assignor to Union Oil Company of California, Los Angeles, Calif., a corporation of California Application March 15, 1949, Serial No. 81,520

34 Claims. (Cl. 183—4.2)

This invention relates to a method for the continuous separation of a gaseous mixture by selective adsorption on a moving bed of solid granular adsorbent and in particular comprises an improved process in which the gas separation process is improved by the inclusion of a method for circulating a solid granular adsorbent through the treating process which utilizes energy liberated from depressuring a product gas stream. It is to be understood, however, that the particular method of solids circulation may be applied to other treating processes in which gaseous or vaporous fluids are contacted with a moving bed of granular solids.

The selective adsorption process is a process for the separation of gaseous mixtures in which the gaseous mixture to be separated is contacted countercurrently with a substantially compact downwardly moving bed of solid granular adsorbent such as charcoal, silica gel, aluminum oxide, or the like. The contact is effected at substantially atmospheric temperatures or a little above and the more readily adsorbable constituents of the gaseous mixture are adsorbed forming a rich adsorbent leaving the less readily adsorbable constituents as a substantially unadsorbed gas. The rich adsorbent is subsequently heated to a temperature usually not exceeding about 500° F. and is directly contacted countercurrently with a stripping gas such as steam to remove adsorbed constituents from the adsorbent. The thus desorbed constituents comprise a rich gas and a lean adsorbent remains substantially saturated at the stripping temperature with the stripping gas. The lean adsorbent subsequently is cooled to the adsorption temperature and is recycled to the adsorption zone to contact further quantities of the gaseous mixture to be separated.

The selective adsorptivity, the property noted in adsorbents whereby certain constituents are adsorbed more strongly than are others, is the basic principle upon which the selective adsorption process functions. The combination of process steps briefly outlined above amplifies the selective adsorption properties of the adsorbent whereby unusually efficient separations of gaseous mixtures result at moderate conditions of temperature and pressure. The selective adsorption process possesses advantages over the conventional gas separation processes involving absorption, extraction, or distillation in which excessively high pressures and unusually low refrigeration temperatures are required in the separation of many gaseous mixtures. For example, a distillation column producing methane as an overhead product must operate at pressures ranging from 500 to 600 pounds per square inch and with a reflux temperature of about —150° F. A pure methane product may be obtained from natural gas at pressures below 100 pounds per square inch and at maximum temperatures in the range of from 300 to 400° F. maximum employing the selective adsorption process.

It has been the practice in the selective adsorption process to convey the solid granular adsorbent from the bottom to the top of the column as a gaseous suspension. Upon reaching a point somewhat above the top of the column, the suspended adsorbent granules are separated from the lift gas and passed into the top of the column.

It is the purpose of the present invention to provide an improved selective adsorption process in which the adsorbent is conveyed from the bottom to the top of the column as an upwardly moving substantially compact bed of solid granular adsorbent in which the recirculation of a lift gas is successfully eliminated and in which contamination of product streams with the lift gas is substantially completely avoided.

It is a primary object of this invention to provide a selective adsorption process improved by the incorporation of a simplified method for circulating large quantities of granular adsorbent.

A further object of this invention is to provide a means for the conveyance of granular solids as a substantially compact moving bed upwardly through a conduit in the absence of mechanical lifting devices such as bucket elevators, drag lines, and the like.

An additional object of the present invention is to provide in the selective adsorption process a method for employing one of the product gases therefrom as a lift gas and by depressuring at least a part of this lift gas to cause the flow of adsorbent from the bottom to the top of the column through a lift line.

A further object of this invention in its preferred embodiment is to provide a process in which a portion of the product removed from the top of the selective adsorption column is used as the lift gas and depressured sufficiently through a lift line to raise the adsorbent flowing into the bottom of the lift line to the top of the lift line.

Another object of this invention is to provide a means for conveyance of solid granular adsorbents in the selective adsorption process using energy obtained by depressuring one of the product streams in such a manner that the depressured product stream as lift gas does not contaminate any of the other product gases.

It is also an object to provide an improved method for controlling the operation of the method of solids conveyance.

A further object of the present invention is to provide an apparatus for the conveyance of any granular solids as a substantially compact vertically moving bed.

Other objects and advantages of this invention will become apparent to those skilled in the art as the description thereof proceeds.

Briefly, the present invention comprises an improved selective adsorption process in which a granular adsorbent is passed downwardly through a succession of zones or sections and is recirculated from the bottom of the column to the top of the column for reuse as an upwardly moving substantially compact bed of solid granular adsorbent. The upwardly moving bed is supplied with energy for lifting by depressuring at least a part of one of the product streams in direct concurrent contact with the adsorbent through a lift line. Under such conditions the bulk density of the adsorbent conveyed through the lift line is substantially the same as the bulk density of the solids when they are at rest.

This is accomplished by forcing a flow of lift gas upwardly through the interstices of the granules to establish frictional forces which are sufficient to overcome the gravitational forces on the adsorbent granules as well as the frictional forces of the conduit walls on the moving bed of adsorbent and cause the mass to move upward. The actual velocity of lift gas necessary to accomplish this result is dependent upon the size and density of the granules, and the viscosity and density of the lift gas which is directly determined by the pressure and temperature. The velocities are sometimes sufficient to cause fluidization of the adsorbent granules if the adsorbent granules were free to fluidize or become suspended in the lift gas. In order to prevent fluidization of the adsorbent granules in the lift gas and maintain the granules as a substantially compact bed, means are incorporated at the upper extremity of the lift line or lift conduit to dissipate the thrusting forces of the upwardly moving bed. Fluidization of solid particles in a gas is possible only when the quantity of gas is sufficient to suspend the particles and the individual particles are free to move and be suspended in the absence of a compacting force. Such a compacting force or compressive force is applied at the upper extremity of the lift line in the form of a thrust plate having a diameter equal to or somewhat larger than that of the lift line and against which the moving bed of granular adsorbent changes its direction of flow to one of gravity flow through a transfer line into the top of the treating vessel or other enclosure in which the granular solids being transported are desired.

Pressure differentials established across the lift conduit by the flow of gas in the moving bed of substantially compact solids depend of course upon the lift gas flow rate, the solid particle size, and other physical conditions. In the conveyance of solid granular charcoal as employed in the selective adsorption process, pressure drops ranging from 10 to as high as 150 pounds per square foot per foot or from about 0.06 to about 1.0 pound per square inch per foot of lift line height are common. Superficial lift gas velocities through the lift line range from as low as 0.2 of a foot per second to as high as 20 feet per second and the granular solids are thereby conveyed in a plug type flow through the lift line characterized by the fact that the individual adsorbent granules are inhibited from any substantial motion relative to one another. For 12 to 30 mesh granular charcoal, superficial gas velocities of from about 0.5 to 10 feet per second may be used with about 1 to 4 feet per second considered optimum. These velocities are insufficient to cause fluidization. The removal of the thrust plate at the top of the lift line described above would, under conditions of maximum gas flow, cause the suspension of the solids in the flow, and the transferal of great quantities of lift gas per unit weight of granular solids conveyed. Preferred gas velocities are those between about 10% and about 90% of those necessary to cause fluidization of a given solid. The prevention of fluidization by the means described above permits the conveyance of the greatest mass of granular solid per unit volume of lift gas and thus the diameter of the conduit necessary for conveyance of granular solids which are circulated through continuous treating or adsorption processes is considerably reduced. It has further been found that since the individual solid particles are prevented from physical motion relative to one another and that the substantially compact mass of solids flows as a cylinder or plug through the lift conduit, loss of solids due to attrition is very low.

In the suspension of granular solids of 12 to 30 mesh size in upwardly moving gases, lineal gas velocities of from about 10 to 30 feet per second are used. For powdered solids, such as catalysts finer than 150 mesh, velocities of from 0.5 to 5 feet per second are used. Under these conditions, the volume of gas per unit weight of solids moved is high and the pressure drop is low. From about 5 to 15 standard cubic feet of air are required to suspend 1 pound of 12 to 30 mesh adsorbent in a suspension or fluidization type conveyance conduit. In the present conveyance apparatus the quantity of lift gas is markedly lower, varying between as low as 0.02 to as high as 1 standard cubic foot per pound of such an adsorbent. This material has been found to be easily and efficiently transported as a substantially compact mass at gas rates of 0.05 to 0.5 standard cubic foot per pound depending on the size and density of the granules.

In the present apparatus the above gas flow conditions cause flow of granular solids through lift lines at from 0.5 to as high as 5.0 feet per second or higher, one typical unit operating between 1.5 and 2.8 feet per second.

Pressure differentials existing through various sections or zones in the selective adsorption column are substantially negligible compared to the differential pressure existing between the lower and upper extremities of the lift line through which the adsorbent is passed. In the preferred modification of this invention the pressure employed at the bottom of the lift line is substantially the same as the pressure existing within the selective adsorption column. Preferably at least part of a gas product stream is introduced at the column pressure into the lower end of the lift line and is depressured therethrough causing upward flow of the adsorbent. The adsorbent is delivered at the top of the column at a pressure substantially less than that within the column and a sealing means such as a sealing leg or any other mechanical seal for the introduction of solids from a low pressure to a high pressure is employed in introducing the lifted adsorbent into the top of the column. Preferably the lift gas comprises at least a portion of product gases removed from the upper extremity of the column such as a portion of the purge gas formed as hereinafter described. When this purge gas is employed for lifting, gas leakage through the aforementioned sealing means is tolerable and presents no contamination problem.

The improved selective adsorption process and apparatus and the improved method and apparatus for conveyance of granular solids may be more readily understood by reference to the accompanying drawing.

Referring now more particularly to the drawing, selective adsorption column 10 is provided at successively lower levels therein with elutriation zone 11, adsorbent hopper zone 12, cooling zone 13, lift gas disengaging zone 14, adsorption zone 15, feed gas engaging zone 16, rectification zone 17, rich gas disengaging zone 18, preferential desorption or steaming zone 19, heating or desorption zone 20, stripping gas inlet zone 21, adsorbent feeder zone 22, bottom zone 23, transfer line 26, and lift line induction zone 29. In some modifications of this apparatus as described below, an adsorbent flow control valve zone may be incorporated in which a seal gas is removed between the bottom zone 23 and induction zone 29 to prevent undue flow of stripping gas into the lift line. Lift line 30 extends into induction zone 29 to a point substantially below the level of adsorbent mass 31 and is provided at its upper extremity with separator zone 32 provided with thrust plate 33 which prevents the adsorbent granules from becoming fluidized and maintains them in a substantially compact condition. Plate 33 is movable, actuated by motive means 33a which may be a hydraulic cylinder, and aids in control of the rate of solids conveyed through lift line 30. Upper transfer line 34 is provided whereby solids are conveyed from separator 32 through pressuring means 27. Pressuring means 27 is provided for transportation of the solid granular adsorbent through a pressure differential whereby the gas present in the interstices of the granular adsorbent is increased from the pressure existing in separator 32 to the pressure existing in elutriation zone 11 at the top of the column. Line 35 controlled by valve 36 is provided to remove a portion of the recirculating stream of adsorbent as it passes through hopper zone 12. This adsorbent is subjected to a separate high temperature steam treatment in a reactivator means not shown to remove accumulated high molecular weight substances adsorbed on the adsorbent. The reactivated adsorbent is returned to the recirculating stream via line 37 controlled by valve 38 and is introduced into transfer line 26.

The description of the operation of the selective adsorption apparatus illustrated in the drawing will be presented in the form of a typical example of the selective adsorption process in which the compact flow lift line is employed. The selective adsorption column is applied to the separation of 15,646 MSCF per day of a refinery gas containing olefins. The column is 9 feet 8 inches inside diameter and about 180 feet tall. Activated coconut charcoal is employed as the adsorbent and is circulated through the column at a rate of 122,200 pounds per hour. The gaseous mixture has the following composition:

TABLE 1

Feed gas composition

| | Volume per cent |
|---|---|
| Inorganic gases | 3.76 |
| Hydrogen | 11.69 |
| Methane | 46.83 |
| $C_2$'s | 27.31 |
| $C_3$'s | 9.05 |
| $C_4$'s | 1.10 |
| $C_5$'s | 0.15 |
| $C_6+$ | 0.11 |
| | 100.00 |

The feed gas mixture is introduced via line 39 controlled by valve 40 into feed gas engaging zone 16 which comprises transverse plate 41 filling the entire cross sectional area of the column and provided with a series of tubes 42 through which the charcoal flows. The feed gas mixture passes upwardly through tubes 42 into adsorption zone 15 wherein the $C_2$ and higher molecular weight hydrocarbons are adsorbed on the charcoal. Substantially all of the $C_1$ and lower molecular weight gases remain unadsorbed, although a small quantity of these constituents is adsorbed with the higher molecular weight constituents. The unadsorbed gas, herein termed a "lean gas" or "discharge gas," passes upwardly to lean gas disengaging zone 14. Here the stream divides and a part is passed upwardly countercurrent to the flow of charcoal through the tubes of cooling zone 13 in order to saturate the fresh or lean charcoal with constituents of the lean gas and to desorb traces of stripping gas from the charcoal. This fraction is termed the "purge gas" and is removed from adsorbent elutriation zone 11 via line 43 controlled by valve 44, and in the preferred embodiment of the present invention is partly passed via line 79 for introduction into induction zone 29 at the bottom of the lift line. Preferably the remaining portion of the purge gas which is not required for lifting purposes is removed from line 43 via line 94 at a rate controlled by valve 95 and flow recorder controller 95a.

Thus two purge gas streams are available from the process, one at the pressure of operation and the other at the pressure of separator 32 which is at a pressure equal to the column pressure minus the lift line differential pressure. If no high pressure purge gas product is needed, the part of purge gas not used as a lift gas may be depressured via line 100 controlled by valve 101 through line 103 controlled by valve 104 into separator 32. In this instance the entire purge gas production passes from separator zone 32 via line 84 into separator 86 in which elutriated adsorbent fines are separated from the combined purge gas and lift gas. The fines-free gas then passes to storage facilities or further treating processes not shown via line 87 at a rate controlled by valve 87a and flow recorder controller 87b.

The remaining part of the unadsorbed gas comprising the lean gas is removed from lean gas disengaging zone 14 via line 45 controlled by valve 46 and back pressure regulator 46a. This lean gas product passes into separator 47 wherein fine suspended particles of charcoal are removed and the lean gas product passes to further processing or storage facilities not shown via line 48 at a rate of 9750 MSCF per day. Adsorbent fines are removed from separator 47 via line 49 controlled by valve 50. When, as in another modification of this process, a portion of the lean gas product is employed as lift gas, it is removed from line 45 via line 105 provided with valve 106 and passed into induction zone 29 in place of the purge gas employed as described above.

The charcoal containing the adsorbed fraction of the feed gas mixture is termed a "rich charcoal" and passes downwardly through feed gas engaging zone 16 into rectification zone 17 wherein it is contacted with a countercurrent flow or rich gas reflux containing substantially pure $C_2$ and higher molecular weight hydrocarbons. In this step the constituents of the reflux gas are preferentially adsorbed by the charcoal and lower molecular weight gases are preferentially desorbed and returned to the adsorption zone. The degree of refluxing action is controlled by increasing or decreasing the rate at which the rich gas product is removed from the column. The charcoal in equilibrium with the reflux gas attains a higher equilibrium temperature than the charcoal temperature in the adsorption zone and the reflux rate therefore is temperature controlled by means of temperature recorder controller 51 actuated by thermocouple point 52 in contact with the charcoal. The extent to which the reflux gas penetrates into rectification zone 17 is thus controlled. The temperature recorder controller actuates control valve 53 by means of which the rate at which the rich gas product is withdrawn from rich gas disengaging zone 18 via line 54 is controlled. The rich gas is passed through surface condenser 55 wherein it is cooled and then via line 56 into vapor-liquid separator 57. Herein any condensate from the rich gas product is separated and is removed therefrom via line 58 at a rate controlled by valve 59 which in turn is actuated by liquid level controller 60. The condensate-free rich gas then passes via line 61 controlled by valve 62 to further processing or storage facilities not shown at a rate of 5895 MSCF per day. A portion of the rich gas may be employed as lift gas in a further modification of this invention to convey the hot charcoal to the top of the column. A portion of the rich gas product is removed in this instance from line 61 via line 107 controlled by valve 108 and is introduced into induction zone 29 as the lift gas. Since the charcoal to be lifted is at quite a high temperature of the order of 500° F. extensive quantities of the rich lift gas are not adsorbed, although the purge gas obtained under these conditions of rich gas lift does contain constituents normally present in the rich gas product. The advantage of using a rich lift gas resides in the fact that the rich gas is of greater density and more viscous than the other gases and less rich gas is required to lift a given amount of carbon.

The rectified charcoal passes through the tubes of rich gas disengaging zone 16 into preferential desorption zone or steaming zone 19 wherein it is contacted by a countercurrent flow of a preferentially adsorbed stripping gas such as steam. Part of this stripping gas in introduced into stripping gas engaging zone 21 via line 63 controlled by valve 64, and the remaining part is desorbed in the lower portion of heating zone 20 from the charcoal by indirect heating. This gas rises through the tubes of heating zone 20 and is preferentially adsorbed in steaming zone 19 and thereby preferentially desorbs the adsorbed rich gas constituents which pass upwardly to rich gas disengaging zone 18. As described above, a part of this passes into rectification zone 17 as reflux while the remaining portion is removed via line 54 as a rich gas product.

The charcoal flowing from steaming zone 19 into the tubes of heating zone 20 is partially stripped, the major proportion of the adsorbed rich gas constituents having been removed. In heating zone 20 the partially stripped charcoal is indirectly heated by heated flue gases or condensing vapors or the like passed outside the tubes through inlet or outlet pipes 63 and 64. The charcoal herein is heated to a temperature of about 450° F. to 500° F. and contacted directly with the stripping gas introduced as above described into engaging zone 21. A substantially complete desorption of the adsorbed constituents is hereby effected and the charcoal leaving the bottom of heating zone 20 is substantially completely free of adsorbed constituents of the feed gas and is saturated at the stripping temperature with the stripping gas. At a temperature of about 500° F. the quantity of adsorbed material is very low, less than 1% or 2% by weight.

The hot lean charcoal passes through adsorbent feeder zone 22 in which a reciprocating type feeder meters a controlled volume of charcoal from a multiplicity of small areas covering the cross sectional area of the column. Its incorporation in the selective adsorption column insures a substantially uniform adsorbent flow rate over the entire cross sectional area of the column. The adsorbent discharging from feeder zone 22 collects in bottom zone 23 as accumulation 65 wherefrom it flows through transfer line 26 into induction zone 29. Accumulation of charcoal 65 is controlled by level control 70 which may actuate plate 33 via motive means 33a in separator 32 or control valve 80 to control the rate of charcoal conveyance through lift line 30 and thereby maintain a constant bed level in zone 23.

In order to insure that the rich gas removed from disengaging zone 18 is not contaminated by lift gas passing from induction zone 29 into bottom zone 23, a quantity of stripping gas is allowed to pass downwardly through transfer line 26 to enter the lift line and eventually become part of the depressured purge gas. The adsorbent is hot and no condensation or excessive adsorption of steam occurs.

The adsorbent is lifted with a mixture of purge gas and stripping steam to separator zone 32 where the adsorbent and lift gas are separated and the adsorbent is delivered via line 34 to pressuring means 27.

Pressuring means 27, situated at the bottom of transfer line 34 at the point where adsorbent is introduced into the top of the column, is required as an essential part of this modification of the selective adsorption process. It is employed to convey the adsorbent present in transfer line 34 to hopper zone 12 within column 10 through a positive pressure differential, the magnitude of which is approximately the same as the magnitude of the pressure differential existing across the lift line. The principal advantage of the present process in which pressure means 27 is situated at the point shown is that the lift gas employed for solids conveyance has substantially the same composition, as far as the requirements of the process is concerned, on each side of pressuring means 27 so that a gas flow therethrough presents no contamination problem.

There are a number of types of apparatus which may be employed to accomplish the function required of pressuring means 27. The well known system of locks conventionally employed in the gas industry for introducing coal or coke into continuous cokers or gas producers may be employed, a plurality of pressure vessels operated in succession may be employed, or a positive displacement pump adapted to increase the pressure of gas existing with the solids may be employed.

In the example described above the feed gas is separated within the column at a pressure of about 130 pounds per square inch and the pressure differential existing across the lift line was 50 pounds per square inch. The adsorbent introduced through pressuring means 27 is pressured from 80 pounds per square inch back to a pressure of 130 pounds per square inch and is reintroduced into the upper portion of column 10 for passage through the zones described above.

Specific details of the lift line employed with this improved selective adsorption process and the method employed for its control are given below.

Induction zone 29 conveniently comprises a cylindrical pressure vessel through the top of which extends lift line 30 to a depth somewhat below level 77 of charcoal accumulation 31. Lift line 30 is provided at its lower extremity with flow restriction 78 by means of which the lower open area of the lift line is decreased to between about 0.1 and 0.9 of the cross sectional area of the remainder of lift line 30. It has been found convenient to employ a flow restriction 78 having a lower opening of about one-quarter of the cross sectional area of the column. This reduction in area causes increased lift gas flow velocities at this point sufficient to suspend the granules in the lift gas and move them into the bottom of the lift line. Once inside the bottom of the line the velocity decreases and the granules are maintained in a substantially compact state having the static bulk density of the material. Presumably other methods for restricting this lower opening may be employed such as the use of orifices, Venturi type restrictions, and the like. Lift gas is introduced into induction zone 29 by means of lines 79 or 71 controlled by valve 80.

Lift gas is passed by the means described above into the gas space of induction zone 29, flows downwardly through the interstices of granular adsorbent in accumulation 31 and passes into the lower open end of lift line 30. In this particular example wherein 122,200 pounds per hour of granular charcoal are circulated, the rate of flow of purge gas is 11,000 standard cubic feet per hour which is introduced at a pressure of about 130 pounds per square inch absolute to be depressured to about 80 pounds per square inch absolute at separator 32. It is significant here to note that in the conveyance means described herein, about 0.09 standard cubic foot of purge lift gas per pound of charcoal is used in lifting whereas between 5 and 15 standard cubic feet per pound are required where the charcoal is fluidized or suspended in the lift gas. This gas passes upwardly through lift line 30 depressuring to about 80 pounds per square inch absolute at separator 32 at the top of the lift line. In passing upwardly through the interstices of the granular adsorbent which is maintained in the lift line as a solid compact condition, frictional forces of the gas which result are sufficient to overcome the downwardly acting forces of gravity and lift line wall friction on the adsorbent granules and to move the compact mass of adsorbent upwardly through lift line 30 as a substantially compact moving bed having very nearly the static bulk density.

Separator 32 is provided with movable thrust plate 33 supported therein by means of support 83 and actuated by motive means 33a. The presence of this plate maintains the moving adsorbent in a substantially compact state and prevents fluidization. It is spaced from the upper end of lift line 30 and preferably is moved in accordance with the level in bottom zone 23 to control the rate of charcoal lifted. A constant flow of purge lift gas is maintained by flow recorder controller 87b. As the level in bottom zone 23 drops, level controller 70 acts to lower plate 33 and decrease the charcoal flow rate in lift line 30. Since feeder 22 delivers a constant volume rate of charcoal, the level is restored to its former position.

Thrust plate may be eliminated if very careful lift gas pressure control is maintained in the induction zone so that the solids flow smoothly over the edge of the upper open end of the lift line 30. The lift gas disengages from the charcoal and is removed via line 84 and introduced into separator 86 wherein suspended charcoal fines are removed from the lift gas. Although controlling the lift line charcoal rate by means of level control 70 and thrust plate 33 is the preferred way, other means may be employed for control in which the lift gas rate is varied. For example, the gas removed from separator 32 may be passed through a back pressure regulator and level control 70 employed to actuate control valve 80 in the lift gas line. If desired, level control 82 in the induction zone may be used to actuate valve 80 as shown, or it may be connected to actuate motive means 33a. Another way for control includes the use of a differential pressure controller which actuates valve 87a in accordance with the pressure drop across the lift line.

A sealing leg and a charcoal flow control valve 26a may be incorporated in transfer line 26 so that level controller 70 actuates the charcoal valve and steam from above and lift gas from below the valve are removed together as a seal gas through line 26b. Stripping gas is thus prevented from entering lift line 30 via induction zone 29.

The charcoal entering hopper zone 12 is elutriated to remove undesirable fines. The elutriated adsorbent establishes level 92 shown which is detected and indicated by level indicator 93 so that adsorbent may be added or removed as is necessary to maintain level 92 below outlet 43 and above cooling zone 13.

Although it is preferable that part of a product gas obtained from the column during operation be employed as a lift gas, during start-up operations it is not possible to employ such a product gas prior to the initiation of production. In this situation it is possible to employ part of the feed gas as a lift gas and if desired it may be employed as lift gas during operation if efficiency of separation and purge gas contamination are factors of minor consideration. Some contamination of the lean gas product usually results, however. Lift gases which are not involved in the separation as part of the feed or as a product may be employed if desired. High density and high viscosity gases may be employed without contaminating the product since lift gas may be prevented from entering the bottom of the column and since part of the purge gas may be depressured up through transfer line 34 via line 109 controlled by valve 110 to prevent a foreign lift gas from entering the top of the column either as a gas or as an adsorbed phase.

As above indicated, the lift gas pressure at the top of lift line 30 was about 50 pounds per square inch less than the pressure existing in the column and in induction zone 29. A material expansion of lift gas occurs during its passage through the compact bed of adsorbent in the lift line causing the lineal gas velocity in the upper sections of the lift line to be somewhat greater than those in the lower part of the lift line. It has been found that such velocity increases throughout the length of a single lift conduit have an adverse effect upon the smooth operation of the apparatus. At high solids conveyance rates voids tend to form in the upper sections of the lift line due to the suspending effect of the increased gas velocity. When the pressure drop across the lift line exceeds about 10% of the absolute pressure of operation such adverse effects are noted at high solids flow rates and preferably compensation should be made for them.

The fundamental design equation relating to this expansion effect across solid flow lift lines according to this invention is given below.

$$\frac{A_x}{3}\left[\frac{A_0}{A_x}\right]^3 + A_x = \frac{aQ}{0.1\mu g \rho^2}\left[\frac{P_0-P_x}{P_x}\right] + 1.33 A_0 \frac{P_0}{P_x}$$

The characters in the above equation have reference to the following:

$a$ is the volume per cent voids of the granular solids, A the cross sectional area of the lift line in square feet, and P refers to absolute gas pressure, subscript zero refers to the bottom of the lift line exclusive of the restricted section and subscript $x$ refers to a point $x$ feet from the bottom of the lift line, $g$ is the gravitational constant 32.2 feet/sec.$^2$, $\mu$ is the gas viscosity in centipoises, $\rho$ is the bulk density of the adsorbent in pounds per cubic foot, and Q is the adsorbent rate in pounds per second. An analysis of this relationship by graphical integration gives the solution for the degree of expansion occurring during transferal of a moving bed of solids upwardly through the lift line according to this invention and will give directly the increase in cross sectional area relative to the cross sectional area at the bottom of the lift line necessary to maintain a constant lineal gas velocity.

To compensate for the accompanying increase in gas velocity with the depressuring of lift gas the cross sectional area of the lift line preferably increases with height in accordance with the foregoing equation so that the lift gas velocity is substantially constant throughout the lift line as the lift gas is depressured. Such a lift line may have a square or a triangular cross section and be provided with trapezoidal sides, it may be conical or it may consist of a series of connected cylindrical sections of increasing diameter with height. Obviously other forms may be employed to accomplish the same results.

In the preferred modification of the process of the present invention, a sealing effect at the bottom of the column is obtained solely by allowing a portion of the stripping steam to pass downwardly with the carbon through transfer line 26 directly into induction zone 29. In this case the gas removed from separator 32 contains substantial proportions of steam or whatever other stripping gas is employed and the carbon is not contaminated thereby due to its elevated temperature. The stripping gas is readily separable from the lift gas by condensation of steam. By allowing a portion of the purge gas to by-pass pressuring means 27 as described above and to pass upwardly through transfer line 34 together with the action of the purge gas passing upwardly through cooling zone 13, a substantially complete stripping of adsorbed stripping gas from the carbon prior to induction into adsorption zone 15 is obtained.

A four inch diameter cylindrical lift line 20 feet in height having a five foot top section of four inch glass pipe was employed in lifting granular charcoal of 12–30 mesh size using air as the lift gas. The following results were noted:

| Pressure Drop, p. s. i. | Charcoal Rate, lb./min. | Charcoal Velocity, Ft./Sec. |
|---|---|---|
| 10 | 106 | 0.58 |
| 16 | 160 | 0.875 |

The charcoal flowed smoothly as a solid plug through the conduit.

Although the improved conveyance method and apparatus disclosed above cooperates unusually well with the selective adsorption process and apparatus in the conveyance of large quantities of solid granular adsorbent, the conveyance method and apparatus is not to be considered as limited thereby since it may be applied to the conveyance of a wide variety of other granular solids such as catalysts in catalytic cracking, hydrogenation, hydrodesulfurization, oxidation and other known catalytic processes. It may be further applied to the conveyance of granular solids such as powdered coal, the loading and unloading of cereal grains into grain elevators from conveyance means therefor, it may be further used in the conveyance of minerals such as those employed in ore processing. In short, wherever granular solids are handled in industrial and agricultural applications the conveyance means of the present invention may be applied.

The improved selective adsorption process described herein has been illustrated as employing granular activated charcoal having a particle size of from 12 to 30 mesh as the adsorbent in the separation of hydrocarbon gases mixtures. It is also to be made clear that this type of gaseous mixture is not to be considered as a limitation to the process since other granular adsorbents may be substituted for granular charcoal and other gaseous mixtures whose constituents have variable degrees of adsorbability may be separated by employing the principles described herein.

The method and apparatus for the conveyance of granular solids and in subcombination with a method and apparatus for the separation of gaseous mixtures on a substantially compact moving bed of solid granular adsorbent is to be considered only by the following claims.

I claim:

1. A process for contacting a fluid with a recirculating stream of granular solids which comprises flowing granular solids through a contacting column containing at least one contacting zone and a variable solids level therein, passing said fluid in contact with said solids in said contacting zone, removing at least one stream of product fluid from said contacting column, flowing said solids following fluid contact into an induction zone to maintain an accumulation therein, flowing at least part of one of said product fluids under its own pressure into said induction zone, depressuring said product fluid as a conveyance fluid from said induction zone through a conveyance zone into a separator zone from the contacting zone pressure to a pressure substantially below said pressure thereby conveying solids from said induction zone through said conveyance zone into said separator zone, applying a thrust force against and thereby restricting the discharge flow of solids from the outlet of said conveyance zone to prevent fluidization and maintain the solids during conveyance in compact unfluidized form and at a bulk density substantially equal to the static bulk density of said solids, repressuring solids flowing from said separator zone in a repressuring zone to the substantially higher pressure of said contacting zone, reintroducing said solids from said repressuring zone into said contacting column, and removing depressured conveyance fluid as a product from the system without recirculation through said conveyance zone.

2. In a treating process wherein a fluid stream is contacted with a compact moving bed of unfluidized granular solids passing downwardly through a column and wherein fluid products from said contact are formed and wherein solids are recirculated through said column, the improvement which comprises conveying said solids in compact form as an upwardly moving unfluidized bed through a conduit by depressuring at least one of said gaseous products concurrently with said solids through said conduit and applying a variable compacting force against said solids discharging therefrom to maintain the solids within said conduit in the form of a compact moving mass having a bulk density substantially equal to the static bulk density of said solids when at rest.

3. A process for contacting a fluid with a recirculating stream of granular solids which comprises flowing granular solids through a contacting column containing at least one contacting zone and a variable solids level therein, passing said fluid in contact with said solids in said contacting zone, removing at least one stream of product fluid from said contacting column, flowing said solids following fluid contact into an induction zone to maintain an accumulation therein, flowing at least part of one of said product fluids under its own pressure into said induction zone, depressuring said product fluid as a conveyance fluid from said induction zone through a conveyance zone into a separator zone from the contacting zone pressure to a pressure substantially below said pressure thereby conveying solids from said induction zone through said conveyance zone into said separator zone, applying a variable thrust force against and thereby restricting the discharge flow of solids from the outlet of said conveyance zone to prevent fluidization and maintain the solids during conveyance in compact unfluidized form and at a bulk density substantially equal to the static bulk density of said solids, varying the restriction of said discharge flow of solids and thereby varying the rate of solids flow through said conveyance zone in accordance with detected fluctuations in said variable solids level, repressuring solids flowing from said separator zone into the substantially higher pressure of said contacting zone and removing depressured conveyance fluid as a product from the system without recirculation through said conveyance zone.

4. A process for contacting a fluid with a recirculating stream of granular solids which comprises flowing granular solids through a contacting column containing at least one contacting zone and a variable solids level therein, passing said fluid in contact with said solids in said contacting zone, removing at least one stream of product fluid from said contacting column, flowing said solids following fluid contact into an induction zone to maintain an accumulation therein, flowing at least part of one of said product fluids under its own pressure into said induction zone, depressuring said product fluid as a conveyance fluid from said induction zone through a conveyance zone into a separator zone from the contacting zone pressure to a pressure substantially below said pressure thereby conveying solids from said induction zone through said conveyance zone into said separator zone, simultaneously applying a solids compacting force to the discharge flow of solids from the outlet of said conveyance zone to prevent fluidization and maintain the solids during conveyance in compact unfluidized form at a bulk density substantially equal to the static bulk density of said solids, varying the flow of said product fluid from said contacting zone into said induction zone in accordance with detected fluctuations in said variable solids level, repressuring solids flowing at a relatively low pressure from said separator zone into said contacting zone maintained at a relatively higher pressure and removing depressured conveyance fluid from said separator zone as a process product without recirculation through said conveyance zone.

5. A method for circulating a stream of granular solids through a vessel wherein such a stream is desired which comprises, removing solids from a treating zone, passing the thus removed solids into an induction zone communicating therewith to form an accumulation of said solids in said induction zone, introducing a lift gas into said induction zone, depressuring said lift gas through a conveyance zone at a rate sufficient to convey said solids from said induction zone to a separation zone, preventing said lift gas from fluidizing said solids and maintaining said solids in said conveyance zone as an unfluidized compact mass having a bulk density therein substantially equal to the bulk density of the solids when at rest by applying a solids compressive force against the moving bed of solids discharging from said conveyance zone into said separation zone, disengaging depressured lift gas from granular solids in said separation zone, raising the pressure of gas present in the interstices of the thus discharged granular solids by an amount approximately equivalent with the pressure differential maintained between said induction and said separation zones, controlling the rate at which solids discharge into said separation zone by varying said compressive force applied therein to said solids in accordance with a fluctuating level of granular solids existing within said treating zone during operation, and passing the thus pressured solids back into said vessel for repassage therethrough.

6. An apparatus for continuously contacting granular solids with a fluid stream which comprises an elongated contacting column, inlet and outlet conduits associated therewith for introduction and removal of the fluid stream, inlet and outlet conduits associated therewith for introduction and removal of recirculated solids, an induction chamber in communication with the solids outlet conduit of said column, a separation chamber communicating with the solids inlet conduit of said column, an elongated conveyance conduit communicating the lower part of said induction chamber with said separator chamber, solids flow restrictive means positioned adjacent the outlet opening of said conveyance conduit within said separator chamber and adapted to apply a compacting force on the solids discharging from said conveyance conduit to maintain said solids therein as a compact unfluidized mass having a bulk density substantially equal to the static bulk density of said solids, a conduit for passage of part of the fluid contacting said solids in said column communicating said column with said induction chamber, means for depressuring said fluid therefrom through said conveyance conduit concurrently with a flow of said unfluidized compact granular solids and a solids pressuring means for passing solids from said separator chamber by gravity back into the top of said contacting column at a pressure higher than that of said separator chamber.

7. An apparatus for continuously contacting granular solids with a fluid stream which comprises an elongated contacting column, inlet and outlet conduits associated therewith for introduction and removal of the fluid stream, inlet and outlet conduits associated therewith for introduction and removal of recirculated solids, an induction chamber in communication with the solids outlet conduit of said column, a separation chamber communicating with the solids inlet conduit of said column, an elongated conveyance conduit communicating the lower part of said induction chamber with said separator chamber, movable solids flow restrictive means positioned adjacent the outlet opening of said conveyance conduit within said separator chamber and adapted to apply a compacting force on the solids discharging from said conveyance conduit to maintain said solids therein as a compact unfluidized mass having a bulk density substantially equal to the static bulk density of said solids and to vary the discharge rate of compact granular solids therefrom, a conduit for passage of part of the fluid contacting said solids in said column communicating said column with said induction chamber, means for depressuring said fluid therefrom through said conveyance conduit concurrently with a flow of said unfluidized compact granular solids and a solids pressuring means for passing solids from said separator chamber back into said contacting column at a pressure higher than that of said separator chamber.

8. An apparatus for continuously contacting granular solids with a fluid stream which comprises an elongated contacting column, inlet and outlet conduits associated therewith for introduction and removal of a fluid stream to be contacted, inlet and outlet conduits associated therewith for introduction and removal of recirculated solids, an induction chamber in communication with the solids outlet conduit of said column, said column adapted for maintenance of a level of granular solids therein, solids level detecting means associated with said column, a separation chamber communicating with the solids inlet conduit of said column, an elongated conveyance conduit communicating the lower part of said induction chamber with said separator chamber, movable solids flow restrictive means positioned adjacent the outlet opening of said conveyance conduit within said separator chamber and adapted to apply a compacting force to solids discharging from said conveyance conduit to maintain said solids therein as a compact and unfluidized mass having a bulk density substantially equal to the static bulk density of said solids and to vary the flow rate of compact granular solids discharging therefrom, actuating means for moving said solids flow restrictive means in accordance with detected fluctuations in said solids level, a conduit for part of the fluid which contacts said solids in said column communicating said column with said induction chamber, means for depressuring said fluid therefrom through said conveyance conduit concurrently with a flow of substantially compact granular solids and a solids pressuring means for passing said solids from said separator chamber back into said contacting column.

9. An apparatus for continuously contacting granular solids with a fluid stream under pressure which comprises an elongated contacting column, inlet and outlet conduits associated therewith for introduction and removal of fluid streams, inlet and outlet conduits associated therewith for introduction and removal of recirculated solids, an induction chamber in communication with the solids outlet conduit of said column, said column adapted to the maintenance of a fluctuating level of granular solids therein, solids level detecting means associated therewith, a separation chamber communicating with the solids inlet conduit of said column, an elongated conveyance conduit communicating the lower part of said induction chamber with said separator chamber, movable solids flow restrictive means positioned adjacent the outlet opening of said conveyance conduit within said separator chamber to apply a compacting force to solids discharging from said conveyance conduit and thereby maintain said solids as a compact unfluidized mass having a bulk density substantially equal to the static bulk density of said solids and to vary the flow rate of compact granular solids therefrom, a conveyance fluid conduit for part of the fluid contacting the solids in said column opening therefrom into said induction chamber wherefrom it flows concurrently with said solids into and through said conveyance conduit, means in said conveyance fluid conduit for varying the fluid flow therethrough, said solids level detecting means being adapted to vary said fluid flow in accordance with fluctuations in said solids level and a solids pressuring means for passing solids back from said separator chamber into said contacting column at a relatively higher pressure.

10. In an apparatus which comprises a vertical elongated contacting column, an inlet conduit for granular solids to be contacted, an inlet conduit for fluids to contact said solids, at least one outlet conduit for product fluids from said column, an outlet conduit for solids following contact with said fluid and means for maintaining a downwardly moving unfluidized compact moving bed of granular solids within said column and adapted to establish a fluctuating level of granular solids therein, the improvement in solids recirculating apparatus associated therewith which comprises an induction chamber communicating with said outlet for solids, an elongated conveyance conduit communicating the lower part of said induction chamber with a separator chamber, said separator chamber communicating through a solids pressuring means with the solids inlet to said column, a conduit communicating said induction chamber with one of said outlet conduits for product fluids from said column, means for depressuring said fluid from said induction chamber through said conveyance conduit whereby said solids are conveyed therethrough from said induction chamber, a movable solids discharge restrictive means positioned within said separator chamber adjacent the outlet opening of said conveyance conduit therein and adapted to apply a compressive force to the compact solids issuing therefrom and maintain solids being conveyed therethrough at a bulk density substantially equal to the static bulk density of said solids and in the form of an unfluidized compact moving bed and motive means for varying the position of said movable restrictive means in accordance with the position of the fluctuating solids level in said column.

11. An apparatus according to claim 10 wherein said movable restrictive means comprises a transverse thrust plate positioned opposite said outlet opening and which is movable with respect to said opening to raise and lower the flow rate of solids through said conveyance conduit.

12. A process for the separation of a gaseous mixture which comprises passing a compact moving bed of solid granular adsorbent downwardly through a cooling zone, an adsorption zone and a desorption zone, passing said gaseous mixture through said adsorption zone forming a substantially unadsorbed lean gas product and a rich adsorbent, desorbing adsorbed constituents from said rich adsorbent in said desorption zone forming a lean adsorbent and a rich gas product, depressuring at least a part of a product gas through an upwardly moving compact stream of unfluidized solid granular adsorbent to convey the same from said desorption zone to said cooling zone and applying a variable solids compacting force to the solid adsorbent discharging from the end of said upwardly moving stream thereof to maintain said stream at a bulk density substantially equal to the static bulk density of said adsorbent when at rest and to vary the rate of flow of said upwardly moving stream of adsorbent.

13. A process for the separation of a gaseous mixture which comprises passing a substantially compact moving bed of solid granular adsorbent downwardly through a column containing a cooling zone, an adsorption zone and a desorption zone at successively lower levels therein, adsorbing the more readily adsorbable constituents of said gaseous mixture in said adsorption zone while passing said gaseous mixture therethrough leaving less readily adsorbable constituents substantially unadsorbed as a lean gas product and forming a rich adsorbent, heating the adsorbent in said desorption zone to desorb the more readily adsorbable constituents as a rich gas product forming a lean adsorbent, removing lean adsorbent from said desorption zone, passing this lean adsorbent as a compact unfluidized upwardly moving bed through a conveyance conduit by depressuring at least a part of a product gas upwardly through said conduit, simultaneously applying a variable solids compacting force to the adsorbent discharging from the outlet opening of said conveyance conduit to maintain said adsorbent therein at a bulk density substantially equal to the static bulk density of said adsorbent, separating the thus depressured product gas from the adsorbent discharging from said conduit varying said compacting force in accordance with fluctuations in a level of granular adsorbent within said column thereby varying the flow rate of said compact solids moving through said conveyance conduit, and pressuring this adsorbent into said column to contact further quantities of said gaseous mixture.

14. In a process for the separation of a gaseous mixture wherein a substantially compact moving bed of adsorbent is passed downwardly through a column containing a cooling zone, an adsorption zone, a desorption zone and a bottom zone containing a variable solids level, wherein said gaseous mixture is passed through said adsorption zone to form a rich adsorbent and a substantially unadsorbed lean gas product and wherein said rich adsorbent is treated in said desorption zone to recover adsorbed constituents as a rich gas product thereby leaving a lean adsorbent, the improvement which comprises the steps of transporting lean adsorbent removed from said bottom zone to said cooling zone as a compact unfluidized upwardly moving bed through a conveyance zone by the steps of depressuring one of said product gases from the pressure of operation through said upwardly moving bed as a conveyance gas at a rate sufficient to convey said solid adsorbent, simultaneously applying a solids compacting force to adsorbent solids discharging from the outlet of said conveyance zone to maintain said adsorbent therein as a compact unfluidized mass having a bulk density substantially equal to the static bulk density of said adsorbent, controlling the adsorbent conveyance rate by varying the thus applied compacting force in accordance with the position of said variable solids level in said bottom zone and introducing the thus transported adsorbent into said cooling zone against a differential pressure substantially equal to the difference between the operation pressure and the pressure of the depressured conveyance gas.

15. A process for the separation of a gaseous mixture which comprises passing a moving bed of granular adsorbent through a selective adsorption column containing a cooling zone, an adsorption zone and desorption zone, passing said gaseous mixture through said adsorption zone thereby adsorbing the more readily adsorbable constituents to form a rich adsorbent and leaving the less readily adsorbable constituents as a substantially unadsorbed lean gas, passing a portion of said lean gas upwardly through said cooling zone as a purge gas, removing the remaining portion of said lean gas as a lean gas product from said adsorption zone, desorbing adsorbed constituents by heating said rich adsorbent in said adsorption zone to form a rich gas and a hot lean adsorbent, removing the desorbed constituents as a rich gas product, passing said hot lean adsorbent from said desorption zone into a conveyance zone, passing the hot lean adsorbent as a compact moving bed upwardly through said conveyance zone by the step of simultaneously depressuring at least a portion of said purge gas through the compact mass of granular adsorbent moving through said conveyance zone and applying a variable solids compacting force to the lean adsorbent discharging therefrom to maintain said adsorbent at substantially its static bulk density, separating purge gas and hot lean adsorbent discharged from said conveyance zone, controlling the rate of adsorbent discharging from said conveyance zone in accordance with a fluctuating level of granular adsorbent existing within said adsorption column, by the step of varying said compacting force and passing the thus separated adsorbent through a pressure seal from said conveyance zone to said cooling zone to form a cool lean adsorbent to contact further quantities of said gaseous mixture.

16. A process for the separation of a gaseous mixture which comprises passing a moving bed of adsorbent through a selective adsorption column containing a cooling zone, an adsorption zone, a desorption zone and a bottom zone, passing said gaseous mixture through said adsorption zone thereby adsorbing the more readily adsorbable constituents to form a rich adsorbent and leaving the less readily adsorbable constituents as a substantially unadsorbed lean gas, passing a portion of said lean gas upwardly through said cooling zone as a purge gas, removing the remaining portion of said lean gas as a lean gas product from said adsorption zone, heating said rich adsorbent and thereby desorbing adsorbed constituents from said rich adsorbent in said adsorption zone to form a rich gas and a hot lean adsorbent, removing the desorbed constituents as a rich gas product, passing said hot lean adsorbent from said desorption zone through said bottom zone into a conveyance zone, passing the hot lean adsorbent as a compact moving bed of unfluidized adsorbent granules upwardly through said conveyance zone by the step of simultaneously depressuring at least a portion of said lean gas product through said conveyance zone in the same direction as the adsorbent flow therethrough and simultaneously applying a compacting force to the adsorbent flowing from said conveyance zone thereby maintaining the adsorbent moving through said conveyance zone in compact unfluidized form and at substantially the same bulk density during conveyance as the normal static bulk density of the adsorbent solids when at rest, varying the adsorbent solids conveyance flow rate by the step of varying the applied compacting force in accordance with a fluctuating solids level existing within said bottom zone, separating adsorbent and depressured lean gas discharging from said conveyance zone and passing the hot lean adsorbent thus obtained through a pressure seal into said cooling zone to form a cool lean adsorbent to contact further quantities of said gaseous mixture.

17. A process for the separation of a gaseous mixture which comprises passing a moving bed of adsorbent through a selective adsorption column containing a cooling zone, an adsorption zone, a desorption zone and a bottom zone, passing said gaseous mixture through said adsorption zone thereby adsorbing the more readily adsorbable constituents to form a rich adsorbent and leaving the less readily adsorbable constituents as a substantially unadsorbed lean gas, passing a portion of said lean gas upwardly through said cooling zone as a purge gas, removing the remaining portion of said lean gas as a lean gas product from said adsorption zone, heating said rich adsorbent and thereby desorbing adsorbed constituents from said rich adsorbent in said adsorption zone to form a rich gas and a hot lean adsorbent, removing the desorbed constituents as a rich gas product, passing said hot lean adsorbent from said desorption zone through said bottom zone containing a fluctuating solids level and into a conveyance zone passing the hot lean adsorbent as a compact moving bed of unfluidized adsorbent granules upwardly through said conveyance zone while depressuring at least a portion of said rich gas product through said conveyance zone, simultaneously applying a solids flow compacting and restricting force to the solid adsorbent discharging therefrom thereby preventing fluidization of the adsorbent solids and maintaining them in compact unfluidized form substantially at their static bulk density within said conveyance zone, controlling the solids conveyance flow rate through said conveyance zone by varying said restricting force applied against the discharge flow of compact unfluidized solids from said conveyance zone in accordance with changes in said fluctuating solids level within said bottom zone, separating said portion of rich gas from adsorbent discharging from said conveyance zone and pressuring the adsorbent thus discharged from said conveyance zone through a pressure seal into said cooling zone to form a cool lean adsorbent to contact further quantities of said gaseous mixture.

18. A process for the separation of a gaseous mixture which comprises passing a moving bed of adsorbent through a selective adsorption column containing a sealing zone, a cooling zone, an adsorption zone, a desorption zone, and a bottom zone having a fluctuating solids level, establishing a conveyance zone communicating with said bottom zone and said sealing zone, passing cool lean adsorbent from said cooling zone through said adsorption zone, contacting said gaseous mixture with said cool lean adsorbent in said adsorption zone forming a rich adsorbent leaving less readily adsorbable constituents as a substantially unadsorbed lean gas, passing at least a portion of said lean gas as a purge gas upwardly through said cooling zone, passing said rich adsorbent from said adsorption zone to said desorption zone, heating said rich adsorbent while contacting the thus heated rich adsorbent with a stripping gas in said desorption zone thereby desorbing the adsorbed constituents forming a rich gas and a hot lean adsorbent, passing said hot lean adsorbent and part of said stripping gas into said conveyance zone, introducing a portion of said purge gas into said conveyance zone, depressuring the lift gas comprising stripping gas and purge gas thus introduced through said conveyance zone at a rate sufficient to effect the upward flow of hot lean adsorbent through said conveyance zone, maintaining the moving solids therein as a compact upwardly moving bed having a bulk density substantially equal to the static bulk density of said adsorbent by the step of applying a solids compacting and flow restricting force to solids discharging from said conveyance zone, controlling the adsorbent solids flow rate therethrough by varying the restriction of the stream of adsorbent solids discharging therefrom in accordance with the position of said fluctuating solids level in said bottoms zone, separating the depressured lift gas from hot lean adsorbent discharging from said conveyance zone and increasing the pressure of lift gas present in the interstices of the thus discharged adsorbent prior to introducing said adsorbent into said cooling zone to form said cool lean adsorbent.

19. In a process for the separation of a gaseous mixture wherein a substantially compact moving bed of adsorbent is passed downwardly through a column containing a cooling zone, an adsorption zone, a desorption zone and a bottom zone, wherein said gaseous mixture is passed through said adsorption zone to form a rich adsorbent and a substantially unadsorbed lean gas product, wherein said rich adsorbent is treated in said desorption zone to recover adsorbed constituents as a rich gas product thereby leaving a lean adsorbent and wherein an accumulation of compact unfluidized adsorbent having a solids level which fluctuates during operation is maintained in said bottom zone, the improvement which comprises passing a portion of said lean gas product through said cooling zone as a purge gas, transporting said lean adsorbent from said desorption zone to said cooling zone as a compact upwardly moving unfluidized solids bed through a conveyance zone by depressuring a portion of said purge gas from the pressure of operation through said upwardly moving bed, applying a compacting force to the adsorbent solids discharging from said conveyance zone thereby maintaining said adsorbent therein as a compact mass having a bulk density substantially equal to the static bulk density of said adsorbent, separating the thus depressured purge gas from the transported adsorbent, controlling the rate at which adsorbent is conveyed through and discharges from said conveyance zone by the step of varying the applied compacting force in accordance with fluctuations in said solids level in said bottom zone and introducing the transported adsorbent into said cooling zone against a differential pressure substantially equal to the difference between the pressure of operation and the pressure of the depressured purge gas.

20. A process according to claim 19 wherein said solid granular adsorbent comprises granular activated charcoal.

21. A method for the separation of a gaseous mixture which comprises passing a moving bed of solid granular adsorbent through a selective adsorption zone containing an adsorption zone, a desorption zone and a bottom zone, passing adsorbent from said bottom zone to an induction zone, maintaining a variable level of adsorbent in each of said bottom and induction zones, filling a conveyance zone communicating with said induction zone and a separator zone with a substantially compact bed of granular adsorbent, introducing said gaseous mixture into said adsorption zone to adsorb the more readily adsorbable constituents thereof leaving the less readily adsorbable constituents as a substantially unadsorbed lean gas, subsequently heating said adsorbent in the presence of a countercurrent flow of stripping gas to desorb the more readily adsorbable constituents as a rich gas, introducing a portion of the less readily adsorbable constituents and a portion of said stripping gas into said induction zone as a lift gas, depressuring the lift gas through said conveyance zone to cause the upward flow of adsorbent therein as a compact moving bed, preventing the fluidization of the adsorbent granules within the conveyance zone by the step of applying a solids compacting force to the adsorbent solids discharging from said conveyance zone to maintain them as a compact moving bed having a bulk density substantially equal to the static bulk density of said adsorbent solids at rest, disengaging the depressured lift gas from said adsorbent discharged from said conveyance zone into said separation zone, controlling the flow rate of lift gas passed into said induction zone in accordance with the fluctuations in the level of adsorbent in said bottom zone and pressuring the thus discharged adsorbent from said separation zone into said selective adsorption zone.

22. A method for separating a gaseous mixture which comprises passing a substantially compact moving bed of charcoal through a selective adsorption zone containing a cooling zone, an adsorption zone, a rectification zone, a preferential desorption zone, a heating zone, a bottom zone having variable solids level therein during operation and a sealing leg zone at successively lower levels therein, passing said gaseous mixture countercurrently through said adsorption zone forming a rich charcoal and a substantially unadsorbed lean gas, contacting said rich charcoal in said rectification zone with a rich gas reflux forming a rectified charcoal, contacting said rectified charcoal in said preferential desorption zone with a countercurrent flow of steam thereby desorbing said rich gas, employing part of said rich gas as said rich gas reflux and removing the remaining portion as said rich gas product, subsequently indirectly heating said adsorbent in the presence of a countercurrent flow of steam to form a hot lean adsorbent, passing said charcoal into said bottom zone and then through said sealing leg zone concurrently with a small quantity of said steam into a disengaging zone, removing a sealing gas comprising steam and lift gas from said disengaging zone, passing said hot lean charcoal from said disengaging zone to an induction zone opening into a conveyance zone, introducing a lift gas into said induction zone, depressuring said lift gas through said conveyance zone from the pressure of adsorption to a substantially lower pressure thereby causing the upward movement of said charcoal therein, simultaneously applying a variable compressive force in a separation zone on the charcoal emerging thereinto from said conveyance zone to maintain said charcoal therein in compact unfluidized form and substantially at its static bulk density and controlling the flow rate of said compact unfluidized charcoal through said conveyance zone by the step of varying said compressive force in accordance with fluctuations in the solids level within said bottom zone, separating depressured lift gas from charcoal in said separation zone, passing charcoal from said separation zone to a sealing zone wherein the pressure of gas with said charcoal is increased by an amount substantially equal to the differential pressure existing across said conveyance zone and subsequently conveying said charcoal from said sealing zone to said cooling zone.

23. A process according to claim 22 wherein said lift gas comprises at least a portion of a purge gas obtained by flowing at least part of said substantially unadsorbed constituents obtained in said adsorption zone through said cooling zone.

24. A process according to claim 22 wherein said gas comprises a fraction of the substantially unadsorbed gas removed from said adsorption zone as a lean gas product.

25. A process according to claim 22 wherein the quantity of lift gas depressured through the upwardly moving and substantially compact bed of adsorbent in said conveyance zone is controlled in accordance with the differential pressure existing across said conveyance zone.

26. An apparatus for the separation of a gaseous mixture which comprises a cylindrical selective adsorption column provided with a cooling section, an adsorption section, a rectification section, a desorption section and a bottom section, a solids conveyance means comprising an induction chamber and a separation chamber and a lift line communicating therebetween, means for introducing adsorbent removed from said bottom section into said induction chamber, means for introducing a gaseous mixture into said adsorption section, means for removing product gases from said adsorption column, means for introducing at least part of one of said product gases into said induction chamber wherefrom it flows concurrently with said adsorbent into and through said lift line to establish a substantial pressure drop therein and to convey said solids therethrough, means in said separation chamber for variably restricting the solids flow from said lift line into said separation chamber in accordance with a fluctuating solids level in said bottom zone thereby controlling the solids conveyance rate and simultaneously maintaining the compact mass of granular adsorbent having a bulk density substantially equal to the static bulk density thereof moving upwardly through said lift line, a solids pressuring means adapted to increase the pressure of gases filling the interstices of the granular adsorbent to a pressure substantially equal to that at the top of said column, means for passing adsorbent from said separation chamber to said pressuring means and means for transferring adsorbent from said pressuring means to said selective adsorption column.

27. An apparatus according to claim 26 wherein said means for conducting at least part of one of said product gases from said column of said induction chamber comprises conduit means for a purge gas communicating the top of said column with said induction chamber in combination with means for controlling the rate of purge gas flowing therethrough.

28. A process for the conveyance of granular solids which comprises flowing solids to be conveyed into an induction zone to maintain an accumulation of solids therein, flowing a conveyance fluid under pressure into said induction zone, depressuring said conveyance fluid therefrom into and through an elongated conveyance zone into a separator zone thereby conveying said solids from said induction zone through said conveyance zone, applying a variable solids flow restricting compressive force to the mass of compact granular solids discharging from the outlet opening of said conveyance zone into said separator zone to maintain the solids during conveyance in compact unfluidized form at a bulk density substantially equal to the static bulk density of said solids, controlling the solids flow rate through said conveyance zone by varying said solids flow restricting force and removing conveyed solids and depressured conveyance fluid from said separator zone.

29. A process for continuous conveyance of granular solids from a vessel into which solids are introduced continuously and in which a variable level of solids is established which comprises flowing solids from said vessel into an induction zone to form and maintain an accumulation of solids therein, flowing a conveyance fluid under pressure into said induction zone, depressuring said conveyance fluid therefrom into and through an elongated conveyance zone into a separator zone thereby conveying said solids from said induction zone through said conveyance zone into said separator zone, maintaining said solids during conveyance in an unfluidized and compact form at a bulk density substantially equal to the static bulk density of said solids by applying a solids flow restricting compressive force to the stream of solids discharging into said separator zone from the outlet opening of said conveyance zone, detecting the position of said solids level of the solids to be conveyed, varying said solids flow restrictive force to vary the solids flow rate through said conveyance zone in accordance with detected fluctuations in said solids level and removing conveyed solids and depressured conveyance fluid from said separator zone.

30. A process for continuous conveyance of granular solids from a vessel into which solids are introduced continuously and in which a variable level of solids is established which comprises flowing solids from said vessel into an induction zone to form and maintain an accumulation of solids therein, flowing a conveyance fluid under pressure into said induction zone, depressuring said conveyance fluid therefrom into and through an elongated conveyance zone into a separator zone thereby conveying said solids from said induction zone through said conveyance zone into said separator zone, maintaining said solids during conveyance through said conveyance zone in the form of a compact unfluidized mass having a bulk density substantially equal to the static bulk density of said solids by applying a variable solids flow restricting compressive force to the stream of solids discharging from the outlet opening of said conveyance conduit into said separator zone, removing conveyed solids and depressured conveyance fluid from said separator zone and controlling the solids flow rate by the step of varying the compressive force applied to said stream of discharging solids in accordance with detected fluctuations in said solids level.

31. An apparatus for conveyance of granular solids which comprises an induction chamber, an inlet conduit for delivery thereto of granular solids, an inlet conduit thereto for introduction of a conveyance fluid under pressure, an elongated conveyance conduit communicating the lower part of said induction chamber with a separator chamber, outlet conduits therefrom for depressured conveyance fluid and conveyed solids, a movable solids flow restrictive means positioned adjacent the outlet opening of said conveyance conduit within said separator chamber and adapted to apply a thrust force against the discharging solids to maintain the solids in said conveyance conduit as a compact unfluidized mass having a bulk density substantially equal to the static bulk density of said solids and means for actuating said restrictive means to maintain a desired solids flow rate through said conveyance conduit.

32. An apparatus for conveyance of granular solids which comprises an induction chamber, an inlet conduit for delivery thereto of granular solids, an inlet conduit for introduction thereto of a conveyance fluid under pressure, an elongated conveyance conduit communicating the lower part of said induction chamber with a separator chamber, outlet conduits therefrom for depressured conveyance fluid and conveyed solids, a movable transverse thrust plate positioned adjacent the discharge opening of said conveyance conduit within said separator chamber, said thrust plate being movable with respect to the outlet opening of said conveyance conduit, said plate being adapted to restrict the rate of discharge of solids from said conveyance conduit and apply a compressive force thereto and maintain solids within said conduit in the form of a compact and unfluidized mass having a bulk density substantially equal to the static bulk density of said solids and means for moving the position of said thrust plate relative to said discharge opening to establish a desired solids flow rate.

33. An apparatus according to claim 32 in combination with a vessel from which solids are removed for conveyance and a solids level detecting means associated with said vessel adapted to vary the position of said transverse thrust plate to vary said solids flow rate in accordance with detected changes in a solids level.

34. An apparatus for conveyance of granular solids which comprises an induction chamber, an inlet conduit for delivery thereto of granular solids, an inlet conduit for introduction of a conveyance fluid under pressure, an elongated conveyance conduit communicating the lower part of said induction chamber with a separator chamber, outlet conduits therefrom for depressured conveyance fluid and conveyed solids, said conveyance fluid passing from said induction zone through said conveyance zone at a rate sufficient to convey said granular solids therethrough, a movable solids flow restrictive means positioned adjacent the outlet opening of said conveyance conduit within said separator chamber and adapted to be moved and thereby to vary the rate of solids discharge from said conveyance conduit and simultaneously to apply a thrust force against the discharging solids to maintain the solids in said conveyance conduit in the form of a compact unfluidized mass having a bulk density substantially equal to the static bulk density of said solids and means for varying the flow rate of said conveyance fluid into said induction chamber.

References Cited in the file of this patent

UNITED STATES PATENTS

| Number | Name | Date |
| --- | --- | --- |
| 727,030 | Tilghman, Jr. | May 5, 1903 |
| 1,422,007 | Soddy | July 4, 1922 |
| 1,825,707 | Wagner, Jr. | Oct. 6, 1931 |
| 2,304,827 | Jewell | Dec. 15, 1942 |
| 2,310,377 | Voorhees | Feb. 9, 1943 |
| 2,338,606 | Voorhees | Jan. 4, 1944 |
| 2,409,353 | Giuliani et al. | Oct. 15, 1946 |
| 2,519,342 | Berg | Aug. 22, 1950 |
| 2,519,873 | Berg | Aug. 22, 1950 |